United States Patent [19]

Yarem et al.

[11] 4,069,980

[45] Jan. 24, 1978

[54] PROCESS AND APPARATUS FOR MECHANICAL SEPARATION OF A COMBINATION OF MEAT AND BONE INTO USEFUL FRACTIONS

[75] Inventors: Joseph Yarem, Puslinch; Werner Poss, Oakville, both of Canada

[73] Assignee: Chemetron Corporation, Chicago, Ill.

[21] Appl. No.: 773,352

[22] Filed: Mar. 1, 1977

Related U.S. Application Data

[63] Continuation-in-part of Ser. No. 636,424, Dec. 1, 1975, Pat. No. 4,025,001.

[51] Int. Cl.² .................................................. B02C 23/16
[52] U.S. Cl. .................................... 241/24; 241/74; 241/86; 241/88
[58] Field of Search .................... 241/24, 74, 84, 84.2, 241/86, 88

[56] References Cited

U.S. PATENT DOCUMENTS

| | | | |
|---|---|---|---|
| 1,716,696 | 6/1929 | Himrod | 241/74 |
| 1,762,367 | 6/1930 | Vandergrift | 241/74 |
| 3,394,649 | 7/1968 | Kemper et al. | 241/74 |
| 3,739,994 | 6/1973 | McFarland | 241/74 |

*Primary Examiner*—Granville Y. Custer, Jr.
*Attorney, Agent, or Firm*—N. M. Esser

[57] ABSTRACT

In known processes and known apparatus for mechanical separation of a combination of meat and bone into useful fractions, the combination is conveyed as by a screw through a screen, which constitutes a portion of an elongated cylindrical conduit, and softer components are expressed through the screen, while harder components are contained by the screen. As such processes and such apparatus have been improved, softer components are expressed outwardly through a plurality of arcuate slots respectively defined on two sides by flexible walls of the screen, major amounts of harder components are contained by the screen, the walls flex to allow minor amounts of harder components to be expressed outwardly through the slots if too small to be effectively contained by the screen without consequent blockage of the screen, such flexing of the walls is limited by an integral spacing element extending across each slot from one wall, and any sinews tending to become ensnared around the element are presented to sharp corners provided on the element and designed to cut such sinews.

11 Claims, 7 Drawing Figures

PROCESS AND APPARATUS FOR MECHANICAL SEPARATION OF A COMBINATION OF MEAT AND BONE INTO USEFUL FRACTIONS

CROSS-REFERENCES TO RELATED APPLICATIONS

This application is a continuation-in-part of U.S. Ser. No. 636,424, filed Dec. 1, 1975, now U.S. Pat. No. 4,025,001, issued Mar 24, 1977, by Joseph Yarem and Werner Poss, and assigned commonly herewith. Said application in its entirety is incorporated herein.

BACKGROUND OF THE INVENTION

This invention relates to processes and apparatus for mechanical separation of a combination of meat and bone into useful fractions. Prior examples of such processes and such apparatus are found in U.S. Pat. No. 3,739,994, U.S. Pat. No. 3,741,772, and U.S. Pat. No. 3,906,118.

Such prior art examples of processes and apparatus may be considered as based to some extent on prior expedients to separate rendered matter and other combinations into useful fractions. Ref. U.S. Pat. No. 3,398,676 and U.S. Pat. No. 3,398,677; also U.S. Pat. No. 1,785,041 and U.S. Pat. No. 1,930,189; cf. U.S. Pat. No. 1,772,262 and French Pat. No. 46,408 (First Addition to No. 764,386).

SUMMARY OF THE INVENTION

In the processes and related apparatus disclosed in the application cross-referenced supra, a combination of meat and bone to be separated into useful fractions, desirably one fraction high in meat content and low in bone content and another fraction low in meat content and high in bone content, is conveyed by a screw having specified features through a screen having specified features. The screen constitutes a portion of an elongated cylindrical conduit. Softer components are expressed through the screen while harder components are contained by the screen. As disclosed in said application, the screen comprises a plurality of annular plates having relatively thinner and thicker portions defining arcuate slots, which are resepectively bridged by spacing elements, As disclosed in said application, the relatively thinner portions of the walls are sufficiently flexible that, as softer components are outwardly expressed through the slots, minor amounts of harder components may also be outwardly expressed through the slots if too small to be effectively contained by the screen without consequent blockage of the slots. The slot-bridging elements serve to limit such flexure.

Other functions of the slot-bridging elements have now been appreciated. When annular washers were tried as possible slot-bridging elements, many sinews quickly became ensnared around the washers, to such extent that intended separation cound not be practiced on a commercially feasible scale.

Hence, it is object of this invention to provide in an apparatus for mechanical separation of a combination of meat and bone into useful fractions, of a type as described supra, an improvement wherein the screen comprises a plurality of annular plates respectively having relatively thicker and thinner portions disposed face-to-face to constitute said screen whereby the respective thinner portions of said plates define arcuate slots between the respective thicker portions of the plates, the respective thinner portions of the plates being sufficiently flexible that, as softer components are outwardly expressed through the slots while major amounts of harder components are contained by the screen, minor amounts of harder components may also be outwardly expressed through the slots if too small to be effectively contained by the slots, wherein each respective thinner portion of each plate is provided with an integral spacing element extending across each such arcuate slot so as to limit such flexure of the respective thinner portions of the plates, and wherein the element has sharp corners designed to cut any sinews tending to become ensnared around the element.

Likewise, it is an object of this invention to provide in a process for mechanical separation of a combination of meat and bone into useful fractions, of a type as described supra, an improvement wherein softer components are expressed outwardly through a plurality of arcuate slots respectively defined on two sides by flexible walls of the screen, while major amounts of harder components are contained by the screen, and the walls flex to allow minor amounts of harder components to be expressed outwardly through the slots if too small to be effectively contained by the screen without consequent blockage of the screen, wherein the flexing of the walls is limited by an integral spacing element extending across each slot from one wall of the walls defining such slot, and wherein any sinews tending to become ensnared around the element are presented to sharp corners provided on the element and designed to cut such sinews.

These objects and other objects, features, and advantages of this invention will be evident, from the description to follow of preferred modes to carry out this invention, with the aid of the drawings next to be briefly described.

BRIEF DESCRIPTION OF THE DRAWINGS

FIG. 1A is a section of a portion of a screw of the apparatus of FIG. 1 to enlarged scale to show more clearly the shape of the root of the screw.

DETAILED DESCRIPTION OF THE PREFERRED MODES

Figure 1:
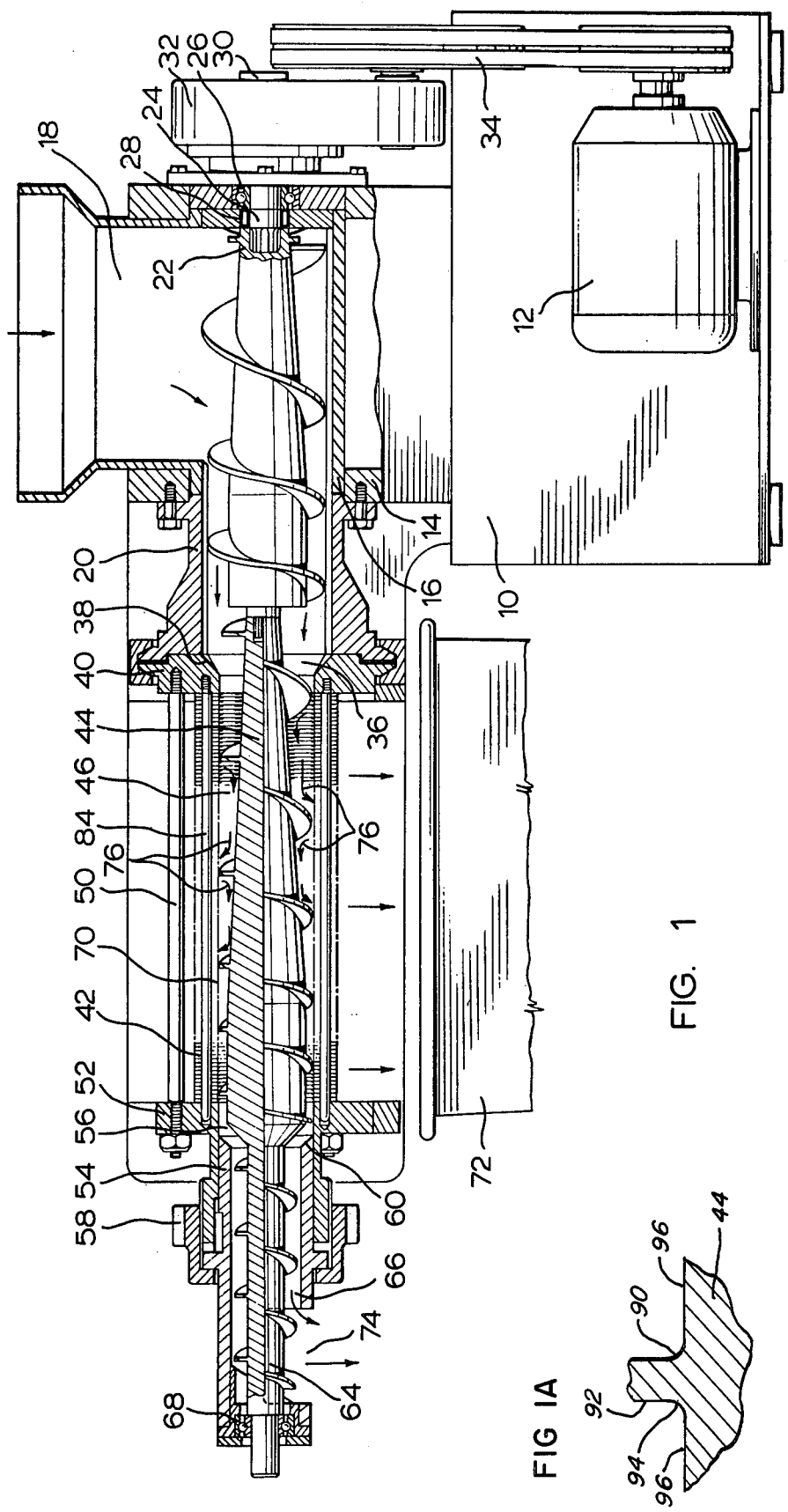
FIG. 1 is a longitudinal sectional view of an apparatus for mechanical separation of a combination of meat and bone wherein upper halves of certain screws are shown in cross-section for clarity of illustration while lower halves of these screws are shown in lateral elevation.

The apparatus of FIG. 1 comprises a base, as indicated generally by the reference 10, in which a drive motor 12 is mounted. On the top of the base is mounted a casing 14 having a tubular extension 16, the casing providing a hopper 18 for the reception of the meat and bone combination to be separated. The casing 14 and extension 16 also provide a conduit 20 having mounted therein a conveyor screw 22, the screw being rotatable about a horizontal longitudinal axis. The rear end of the screw 22 is splined and is in rotational driving engagement with a splined boss 24 mounted in the casing by bearings 26; seals 28 are also provided. This boss is constituted by the free end of the output shaft 30 of a speed reduction gear 32, the input to the speed reduction gear being via a belt drive 34 from the drive motor 12.

This conveyor screw 22 is of conventional form and the diameter of its body increases progressively from the inlet provided by the hopper into the extension while the radial depth of its lands decreases correspondingly to maintain a constant external diameter for the whole screw; the pitch of the screw between successive lands also decreases progressively, with the result that the meat and bone combination is forced into the tubular extension and is subjected therein to an increasing pressure as it travels along the conduit 20. The pressurized combination is fed through a tapered annular outlet 36 of decreasing diameter in the direction of the flow formed by inner tapered surface 38 of an annular part 40 fastened to the extension 20.

A separator screen indicated generally by reference 42 cooperates with a separating screw number 44 mounted in bore 46 therein to separate into different fractions the pressurized combination of meat and bone fed thereto by the screw 22. Two forms of separator screen are to be described in detail below, and either form is constituted by a large number of annular discs 48 (FIG. 2), which are clamped tightly face-to-face by a set of circumferentially-spaced longitudinal tie-rods 50 extending between the part 40 and an axially-spaced tubular part 52. Another tubular part 54 is slidable within a bore 56 in the part 52 and is embraced by a cap nut 58 that is screw-threaded on to the free end of the part 52. The end of the part 54 within the bore 56 is provided with a tapered face 60 cooperating with a tapered face at the adjacent end of the screw member 44 to constitute a throttle controlling the pressure that is applied to the separating meat and bone within the cylindrical conduit 46.

The separating screw 44 has integral therewith a discharge screw 64 which rotates within a bore 66 in the part 54, the other end of the screw 64 being carried by a bearing 68.

In operation, the meat and bone combination, which may comprise, for example, the otherwise-discarded necks and backs of broiler chickens, is fed continuously to the hopper 18 and passed by the screw 22 through the conduit 20 and under pressure to the interior of the conduit 46. Under the special action of the separating screw member 44, to be described below, the combination is pressed outwardly against the cylindrical interior surface 70 of the separator screen 42. The softer meat fraction passes radially outwards through the screen and is collected in a suitable receptacle 72, while the more rigid bone, sinew, etc., fraction is carried along by the screw member 44 within the bore 46 until it is discharged through the throttle opening 66 in the part 54. The bone ect., fraction is then moved by the discharge screw 64 through the bore 66 to an outlet 74, where it is collected in a separate receptable (not shown).

The separated meat fraction is found to have a markedly different physical structure from that produced by any of the machines at present known to the inventors herein and may be distinquished therefrom as being more coherent and not emulsified, with greater retention of the longitudinal fibrous structure characteristic of animal muscle tissue. It is believed at present that this difference in physical structure is due to the new manner in which the separator screw member 44 presents the pressurized meat and bone to the separator screen 42, and also to the new manner in which the screen is operative to separate the meat and bone fractions.

The screw 44 comprises a plurality of successive lands, and the pitch of the lands decreases progressively along its length to compensate for the loss of separated meat product through the separator screen, and so that the pressure applied to the meaat and bone combination within the bore 46 is maintained within predetermined limits. Each land of the helix is shaped to have the root 90 of its rear face curved so that it is arranged to direct the combination outwards, while the upper portion 92 of the front face of each land is shaped to direct the material it engages radially inwards toward the screw axis toward a curved root 94 between the land and the body 96 of screw 44 (see FIG. 1A). This special land shape therefore creates between each immediately successive pair of leading and trailing lands an elliptical movement of the material, with the material stationary or relatively so while it is in contact with the inner face of the separator screen. This movement, as indicated by the arrows 76, is radially outwards adjacent the leading land, radially inward adjacent the trailing land, and forward from the trailing land to the leading land adjacent the screw body, and is superimposed upon the general movement of the material lengthwise of the screw toward the outlet 56.

Another way of describing the motion is that the material is "peeled" from the surface of the separator screen by the leading face of the trailing land, and is then "tucked under" the material already against the separator screen in its movement in the direction of flow. While this movement is happening there is a constant pressure radially outward upon the material. This particular circulation, in which the part of the material in contact with the separator screen is stationary or at least relatively so, is believed to be a principal factor in the performance of the process and the apparatus. Thus, the material is forced under the radially outwardly operative pressure applied thereto against the screen with the minimum of shearing along the screen inner surface, and it is believed that it is this shearing which is responsible for many undesirable effects of prior mechanical separating processes and apparatus.

There is of course a tendency for the material in contact with the screen to be moved across its face by the action of the screw, and the tendency is resisted by the friction between the material and the screen surface. This friction cannot be so high that the material preferentially shears internally, since internal shearing will give rise to an undesirable temperature increase.

The differences in physical structure between the separated meat product of the apparatus and process of this invention shows that inherently a different separating process is involved. Owing to the special movement of the material there is no opportunity for the accumulation of particles of bone against the inner surface of the separator screen. The meat tissue separates from the bone and flows through the slots in the form of relatively long thin sheets, as compared to the "particle" emulsion or slurry structure obtained with prior apparatus and precesses. Another beneficial effect which is believed to flow from this minimization of shearing in the direction of flow is the reduction of bone slivers in the meat fraction. It is found with our new process and apparatus that the temperature increase in the product is passing through the machine can be held to below the limits set by most authorities. This smaller temperature increase has a number of beneficial effects:

a. There is no requirement for the pre-cooling of the product below the temperature at which it is in any case normally stored or transported.

b. A machine of given size can be operated faster with a greater throughput of product without exceeding the specified temperature limit.

c. A reduced consumption of energy caused by friction is evidenced by the lower temperature rise.

d. A sharp temperature increase is evidence of strong forces applied to the mixture and is believed to be accompanied by damage to the cell structure that permits rapid dehydration of the resulting meat product; the meat product of the invention shows a reduced tendency to subsequent dehydration and leaching thereof.

It has been found that the rigidity or flexibility of the rings is of importance in obtaining a satisfactory separating action. If the rings are too flexible the proportion of the bone to the meat fraction increases and bone slivers pass through, while if they are too rigid the meat content of the bone fraction immediately is increased and higher pressures must then be employed to obtain an acceptable separation, resulting in higher temperature rises, even with our improved process. Moreover, with plates that are too rigid the desirable fibrous structure is more difficult or even impossible to obtain.

It is known to those skilled in the art of mechanical meat and bone separation that apertures of about 0.02 inch (0.05 cm) are required in the separating screen for adequate bone retention, and this is the usual spacing employed for the circumferential slots 76. However, the flexing that is possible in the plates of the apparatus of the invention appears to be highly beneficial for reasons which are not yet fully evident. It is believed at present that the flexing may permit the passage of the "sheets" of fibrous tissue through the somewhat enlarged spaces, while closing down the immediately adjacent slots somewhat to provide better bone retention. It will be apparent that this effect cannot be achieved with the perforated screens that have been employed hitherto, comprising a large number of closely spaced holes, since there is no way in which a hole can flex to any great extent to open further with a converse effect upon immediately adjacent holes.

The annular discs or plates 48 may be formed from stainless steel alloy sheets (alloy 303 or 304) of thickness 0.060–0.125 inch (0.15–0.32 cm). The parts 86 may be milled to a depth of 0.015–0.02 inch (0.037–0.05 cm).

Figure 2:
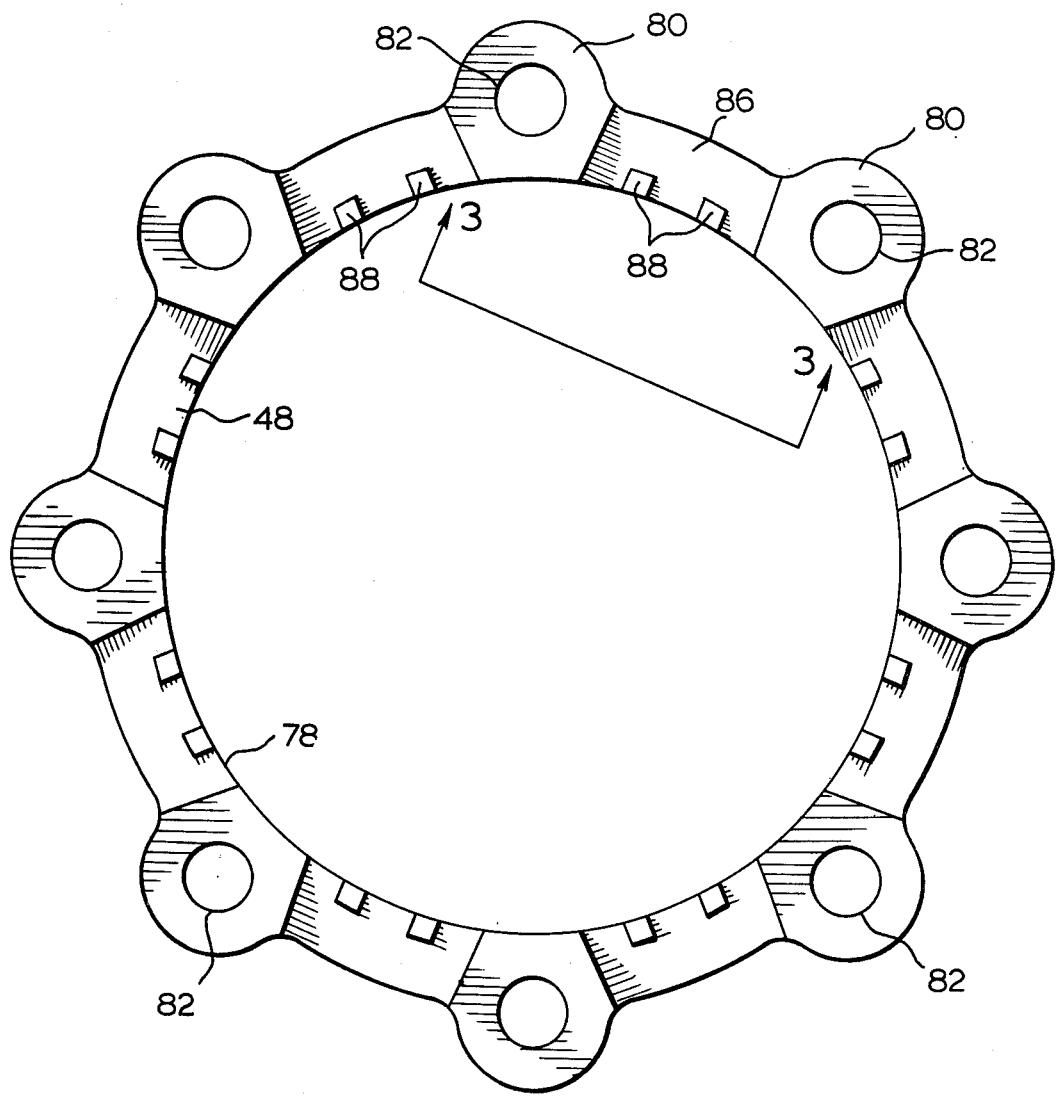
FIG. 2 is an elevation of one form of annular plate as used in one form of the apparatus of FIG. 1.
Figure 3:
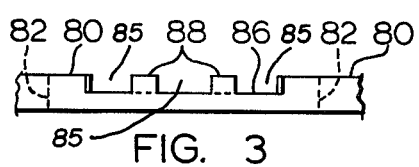
FIG. 3 is a section taken along line 3—3 of FIG. 2 to a somewhat enlarged scale.

As disclosed in the application cross-reference supra and then thought to be preferable, the aforesaid separator screen may be made of a series of annular plates 48, as respectively shown in FIGS. 2 and 3. Each plate 48 has an inner cylindrical face 78 forming the bore 46, while its outer face has a number of protrusions 80, each of which has a bore 82 therein for the passage of a respective locating stud 84 engaged in the members 40 and 52. The parts 86 of each plate on one side between two immediately adjacent protrusions 80 are removed, so that the clamping of the plates 48 face-to-face leaves a series of thin circumferential slots 85 between adjacent parts 86 through which the high-meat component flows to separate the high-bone components, which moves through the bore 46 to the outlet. Small portions 88 of the parts 86 are left to provide corresponding spacing elements, which accurately maintain the axial spacing of the slots 86.

Figure 4:
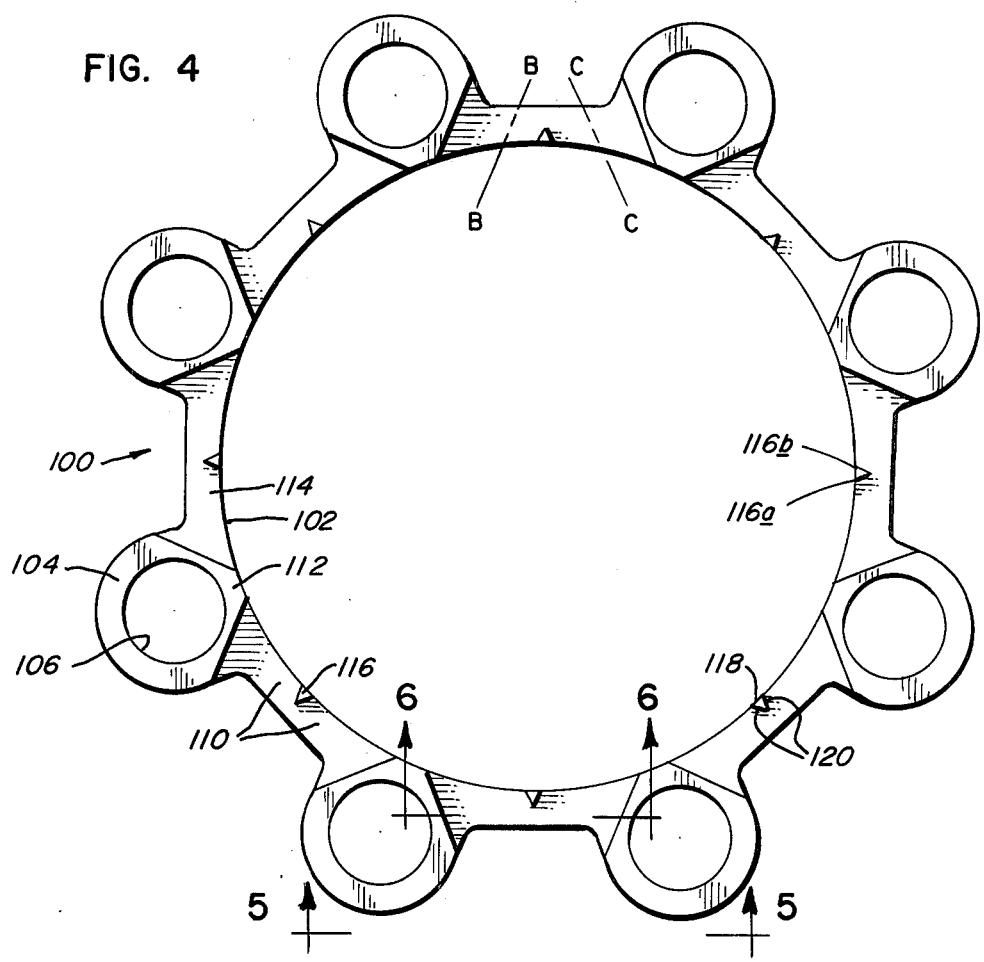
FIG. 4 is an elevation of another form of annular plate as used in another form of the apparatus of FIG. 1.
Figure 5:
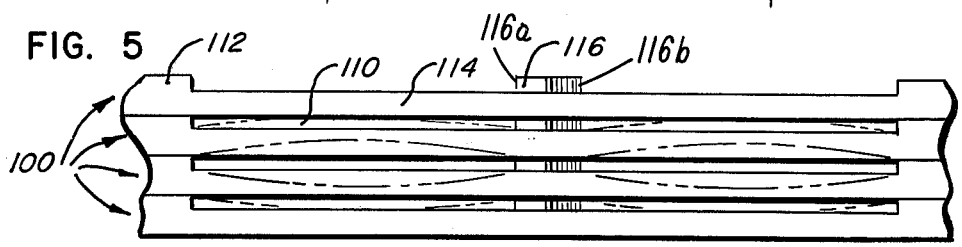
FIG. 5 is an elevation.
Figure 6:
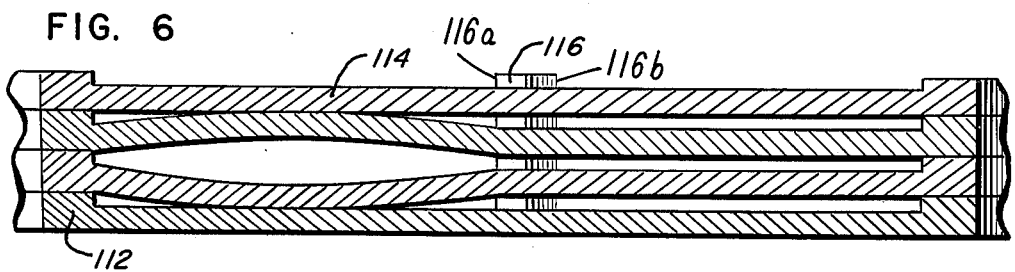
FIG. 6 is a section to a somewhat enlarged scale as taken respectively along line 5—5 and line 6—6 of FIG. 4 to show certain flexing of certain parts of the plate of FIG. 4 and other similarly formed plates associated with the plate of FIG. 4.

As the functions of such elements became more thoroughly understood, another form of annular plate 100, as shown in FIGS. 4 through 6, became preferable to the form of FIGS. 2 and 3. It is to be noted that typical combinations of meat and bone to be separated into useful fractions contain many sinews that tend to become ensnared about whatever elements are employed to maintain axial spacing of the plates of the screen.

FIG. 4 shows a plate 100 similar to the plate 48 except as noted below. FIGS. 5 and 6 show a series of such plates 100 as found in the aforesaid separator screen 42.

Each plate 100 has an inner cylindrical edge 102 helping to define the axially extending bore 46 of the screen 42 and a radially outer edge having eight protrusions 104 respectively formed with a bore 106 to receive a respective locating stud 84 as before. One axially directed face of each plate 100 is milled, or equivalently fabricated, to provide respective thicker and thinner portions and thus a plurality of arcuate slots 110 between the respective thicker portions 112 of the plates 100.

As shown in FIGS. 5 and 6, the respective thinner portions 114 of the plates 100 are sufficiently flexible that, as softer components are outwardly expressed through the slots 110 while major amounts of harder components are contained by the screen 42, minor amounts of harder components may also be outwardly expressed through the slots 110 if too small to be effectively contained by the screen without consequent blockage of the slots 10. Nevertheless, it has been found that the expressed harder components may be effectively limited to minimal amounts that may be tolerated, under applicable governmental and industrial standards.

Each respective thinner portion 114 is provided with one integral spacing element 116 (cf. two elements in FIGS. 2 and 3) extending across each such arcuate slot 110 so as to limit such flexure of the respective thinner portions 114 of the plates 100. Preferably, each element 116 is of uniform thickness with the respective thicker portions 112 of the plate 100, and the elements 116 are uniform as shown, as may easily be achieved by two passes with a cylindrical milling cutter respectively, along lines B—B and line C—C of FIG. 4 as an example.

Each element 116 is provided wth sharp corners, 116a and 116b as shown, that preferably have included angles of less than 90°. As shown such angles are formed by respective intersections of curved faces 118 and flat faces 120. As a result, any sinews that tend to become ensnared around the elements 116 tend to be cut by the corners 116a and 116b of the elements 116. Thus, the slots 112 are not as easily blocked by ensnared sinews, and overall operation of the aparatus is enhanced to a condition of commercial feasibility.

Preferred dimensions given in the application cross-referencesupra remain preferable as applicable. Thus, it is preferred that each plate 100 be from about 0.060 to about 0.125 inch thick and that each slot 112 be from about 0.015 to about 0.02 inch wide, in a sense normal to its arc.

We claim:

1. In an apparatus for mechanical separation of a combination of meat and bone into useful fractions, of a type comprising an elongated cylindrical conduit, a portion of which is constituted by a screen, and a screw, which is rotatable within said conduit to convey the combination through said conduit and to express softer components of the combination through said screen while harder components of the combination are contained by said screen, an improvement wherein (a) said screen comprises a series of annular plates respectively having relatively thicker and thinner portions disposed face-to-face to consitute said screen whereby the respective thinner portions of said plates define arcuate slots between the respective thicker portions of said plates, the respective thinner portions of said plates being sufficiently flexible that, as softer components are outwardly expressed through said slots while major amounts of harder components of the combination are contained by said screen, minor amounts of harder components of the combination may also be outwardly expressed through said slots if too small to be effectively contained by said screen without consequent blockage of said slots, wherein (b) each respective thinner portion of each plate is provided with an integral spacing element extending across each such arcuate slot so as to limit such flexure of the respective thinner portions of said plates, and wherein (c) said element has sharp corners designed to cut any sinews tending to become ensnared around said element.

2. The improvement of claim 1 wherein said corners have included angles less than 90°.

3. The improvement of claim 2 wherein (d) said element is essentially of uniform thickness with the respective thicker portions of said plate.

4. The improvement of claim 3 wherein (e) each plate is from about 0.060 to about 0.125 inch thick at its respective thicker portions.

5. The improvement of claim 4 wherein (f) each slot is from about 0.015 to about 0.02 inch wide in a sense normal to its arc.

6. The improvement of claim 5 wherein (g) said slots extend circumferentially around said screw.

7. The improvement of claim 3 wherein (h) each plate is flat on one face.

8. The improvement of claim 7 wherein (i) each plate is formed with a stepped face opposite to said flat one face thereby defining between the two opposite faces its respective thicker portions and its respective thinner portions.

9. In a process for mechanical separation of a combination of meat and bone into useful fractions, of a type comprising the steps of conveying the combination through a screen, which constitutes a portion of an elongated cylindrical conduit, and expressing softer components of the combination by the screw through the screen, while containing harder components of the combination by the screen, an improvement wherein (a) the process comprises the steps of expressing softer components outwardly through a series of arcuate slots respectively defined on two sides by flexible walls of the screen, while containing major amounts of harder components of the combination by the screen, and flexing the walls to allow minor amounts of harder components of the combination to be expressed outwardly through the slots if too small to be effectively contained by the screen without consequent blockage of the slots, wherein (b) the flexing of the walls is limited by an integral spacing element extending across each slot from one wall of the walls defining such slot, and wherein (c) any sinews tending to become ensnared around said element are presented to sharp corners provided on said element and designed to cut such sinews.

10. The improvement of claim 9 wherein (d) such sinews are presented to said corners having included angles of less than 90°.

11. The improvement of claim 9 wherein (e) such flexing of the walls is limited by said element having a thickness which is essentially uniform with a dimension of the slot, as both the thickness of said element and the dimension of the slot are measured from the wall from which extends said element.

* * * * *